(12) United States Patent
Fernandes

(10) Patent No.: US 7,797,842 B2
(45) Date of Patent: Sep. 21, 2010

(54) MULTI-FUNCTIONAL CARPENTRY TOOL

(76) Inventor: Patrick Fernandes, 156 Campbell Ave., Marion, IN (US) 46952

( * ) Notice: Subject to any disclaimer, the term of this patent is extended or adjusted under 35 U.S.C. 154(b) by 69 days.

(21) Appl. No.: 12/315,577

(22) Filed: Dec. 4, 2008

(65) Prior Publication Data

US 2009/0193670 A1   Aug. 6, 2009

Related U.S. Application Data

(60) Provisional application No. 61/025,961, filed on Feb. 4, 2008.

(51) Int. Cl.
B43L 7/10 (2006.01)
(52) U.S. Cl. ................. 33/27.03; 33/473
(58) Field of Classification Search .......... 33/27.03, 33/473
See application file for complete search history.

(56) References Cited

U.S. PATENT DOCUMENTS

| | | | | |
|---|---|---|---|---|
| 267,381 | A * | 11/1882 | Thornburg | 33/473 |
| 765,300 | A * | 7/1904 | Williams | 33/27.03 |
| 1,040,284 | A * | 10/1912 | Cunningham | 33/473 |
| 1,268,230 | A * | 6/1918 | Frazier | 33/473 |
| 1,346,409 | A * | 7/1920 | Lucas | 33/473 |
| 1,691,118 | A * | 11/1928 | Lissy | 33/473 |
| 2,470,035 | A * | 5/1949 | Hudkins | 33/418 |
| 2,658,278 | A * | 11/1953 | Debs | 33/473 |
| 2,983,048 | A * | 5/1961 | Keller | 33/27.03 |
| 3,089,245 | A * | 5/1963 | Cromer et al. | 33/342 |
| 4,525,933 | A * | 7/1985 | Patterson | 33/470 |
| 5,353,509 | A | 10/1994 | Black | |
| 5,446,969 | A * | 9/1995 | Terenzoni | 33/419 |
| 5,915,806 | A | 6/1999 | Levee | |
| 6,049,990 | A | 4/2000 | Holland | |
| 6,134,795 | A | 10/2000 | Hitchcock | |
| 6,260,283 | B1 | 7/2001 | Abernathy et al. | |
| 7,082,692 | B2 | 8/2006 | Shapiro | |
| 7,269,909 | B1 | 9/2007 | Barbieri | |
| 2006/0168835 | A1 | 8/2006 | Casner et al. | |

* cited by examiner

Primary Examiner—Christopher W Fulton
(74) Attorney, Agent, or Firm—James Ray & Assoc (57) ABSTRACT

A multi-functional carpentry tool includes a base member having a longitudinal T-shaped groove formed therewithin and a rule member. A T-shaped slide member is positioned within the groove and has a threaded aperture formed therewithin. A knob has a threaded stem operatively received within the threaded aperture for selectively securing the base member and the rule member together in frictional engagement maintaining the base member and the rule member in selected positions relative to one another and permitting each of a sliding and pivoting movement of the rule member relative to the base member. Linear measuring scale indicia is provided in each of the base and rule members. Angular measuring scale indicia and a squaring groove is also provided within the base member. A spring biased pin is movably mounted within the knob for defining pivot axis and facilitating arc scribing effort.

9 Claims, 3 Drawing Sheets

MULTI-FUNCTIONAL CARPENTRY TOOL

CROSS-REFERENCE TO RELATED APPLICATIONS

This application is related to and claims priority from Provisional Patent Application Ser. No. 61/025,961 filed on Feb. 4, 2008.

FIELD OF THE INVENTION

The present invention relates, in general, to multi-functional combination carpentry tools and, more particularly, this invention relates to such tool having a base member and a rule member that can be pivoted about and slideably moved along the base member and that can be frictionally clamped at various angles thereto.

BACKGROUND OF THE INVENTION

As is generally well known, during installation of drywall sheets in a corner region of a room, the new drywall sheet to be installed often leaves undesirable gap with already installed drywall sheet on the adjacent wall. Accordingly, this new drywall sheet must be cut, generally at an angle, in order to provide proper fit. When using conventional rigid T-square, the installer must try to tip the square, hold it in place, and finally make the cut, which can be slow and cumbersome.

Prior to the conception and development of the present invention, efforts have been made to alleviate difficulties arising during installation of the drywall sheets.

U.S. Pat. No. 7,082,692 issued to Shapiro discloses an adjustable ruler that includes two elongated ruler members and an adjustable clamping members enabling these rulers to be frictionally secured at various angles to one another.

U.S. Pat. No. 6,260,283 issued to Abernathy et al. discloses another form of the multi-functional carpentry tool that includes a base plate having opposed front and back major surfaces, and at least one side edge bearing surface perpendicular to the front and back surfaces. A pivot ruler is secured to the base plate and extends across and parallel to the front major surface and outwardly from the base plate. The pivot ruler includes an elongated marking member having opposing straight side edges. A longitudinal slot is formed in the marking member parallel to and between the opposed side edges of the marking member. A pivot attachment device is received through the slot of the marking member and into the base plate for pivotably attaching the marking member to the base plate. The marking member is slidable across the front major surface of the base plate a distance equal to the length of the slot.

U.S. Pat. No. 6,049,990 issued to Holland discloses yet another multifunctional layout tool that is capable of performing the functions of an adjustable square, adjustable T-square, try square, combination square, protractor, angle duplicator, depth gauge, rip gauge, rafter-stair layout tool, and compass. The tool comprises a generally T-shaped squaring base, mounting an elongated sliding rule. The base is comprised of a body defining a central flared channel to receive the rule and a pair of squaring arms extending from the body, defining a squaring edge along an end of the base, perpendicular to the channel. The rule is disposed in and extends out of the channel, between the squaring arms. The rule is a blade having a rounded end, a square end, and a central longitudinal slot. A fastener anchored to the base, extending through the rule slot, maintains the rule within the channel. Protractor indicia disposed within the channel and corresponding vernier indicia on the rounded end of the rule measure disposition angles of the rule when the rule is fully extended. Direct reading intermediate angle indicia, comprising paired parallel lines can be disposed within the flared portion of the channel. Direct measurement indicia along the blade initiates from the square end of the blade; and radius measurement indicia for drawing a circle of a given radius, measured from the squaring edge of the base, initiates from the distal end of the blade slot. Alternatively, a vial level may be disposed generally parallel with the squaring edge, in a recess defined in the back of the base.

U.S. Pat. No. 7,269,909 issued to Barbieri discloses a rafter layout tool that includes a protractor member, measurement indicator arm and 90 degree arm that move up and down and side to side for different size lumber which is pivotally connected to the base of the protractor member and incorporating means for indicating pitch markings on said protractor. Extending linearly along the measurement indicator arm is a bounded slot providing means for slideably up and down and attaching the 90 degree arm ably to slide side to side and up and down for different size lumber.

U.S. Pat. No. 6,134,795 issued to Hitchcock and U.S. Pub. No. 2006/0168835 published to Casner et al. provide other devices suitable for installing drywall.

While the above prior art devices are capable of facilitating drywall installation, there is a continuing need for a multi-functional combination carpentry tool providing functional and structural improvements.

SUMMARY OF THE INVENTION

The invention provides a multi-functional carpentry tool. The tool includes a base member. The base member includes a first elongated body having a first uniform thickness throughout. The base member also includes a pair of first side edges, each of the pair of first side edges disposed substantially parallel to a longitudinal axis of the first elongated body. There is also a pair of major surfaces disposed perpendicular to the pair of first side edges. An elongated groove is provided and has a longitudinal axis thereof substantially aligned with the longitudinal axis of the first elongated body. The groove is defined by a main portion formed in one surface of the first elongated body. The main portion has each of a base surface disposed parallel to and recessed a first predetermined distance from the one surface of the first elongated body and a pair of parallel sides. The groove further has a pair of channels, each of the pair of channels abutting a respective side of the main portion and extending a predetermined distance into the first elongated body toward a respective first side edge. A bottom surface of each channel is disposed coplanar with a base surface of the main portion. The pair of channels forms a generally T-shaped cross-section of the elongated groove in a plane perpendicular to the one surface of the first elongated body. The first elongated body has a pair of end notches, each of the pair of end notches disposed in the one surface of the first elongated body at a respective end thereof, wherein a surface of the each end notch is disposed substantially coplanar with the base surface of the main portion of the elongated groove. There is a first linear measuring scale indicia disposed along one first side edge of the first elongated body. A pair of first protractor means is provided. Each of the pair of first protractor means disposed adjacent to and spaced from the respective end of the first elongated body. Each first protractor means has a first mark line provided on the one surface of the first elongated body perpendicular to the pair of parallel first side edges thereof, and a pair of first angular measuring scale indicia. Each of the pair of first angular measuring scale indicia is aligned relative to each of the first mark line and the respective first side edge of the first elongated body. A second protractor means is also provided and is disposed mediate ends of the first elongated body. The second protractor means is defined by a pair of spaced apart second mark lines provided on the one surface of the first elongated body perpendicular to the pair of parallel first side edges thereof and a pair of second angular measuring scale indicia. Each of the pair of second angular measuring scale indicia is aligned relative to each of a respective second mark line and one first side edge of the first elongated body. There is a squaring groove that is disposed mediate the ends of the first elongated body and perpendicular to the longitudinal axis thereof. Each end of the squaring groove is aligned in open communication with the respective first side edge of the first elongated body and wherein a base surface of the squaring groove is recessed a second predetermined distance from the one surface of the first elongated body. The tool also includes a rule member. The rule member includes a second elongated body having a second uniform thickness throughout and a pair of second side edges. Each of the pair of second side edges is disposed substantially parallel to a longitudinal axis of the second elongated body. An elongated slot is formed through the second elongated body and aligned with a longitudinal axis thereof. The elongated slot has a first end thereof disposed adjacent to and spaced from a first end of the second elongated body. There is a pair of second linear measuring scale indicia. Each of the pair of second linear measuring scale indicia disposed on one surface of the second elongated body along a respective second side edge thereof. The tool further includes at least one bubble level mounted within a predetermined portion of one of the first and second elongated bodies in operative alignment with a respective side edge thereof. A clamping means is provided for selectively securing the base member and the rule member together in frictional engagement maintaining the base member and the rule member in selected positions relative to one another and permitting each of a sliding and pivoting movement of the rule member relative to the base member. The clamping means includes a slide member having a T-cross-section so that the slide member is operatively and slideably received within the elongated groove of the first elongated body. The slide member also has a predetermined thickness so that an upper surface of the slide member is recessed a third predetermined distance from the one surface of the first elongated body. A threaded aperture is centrally formed through the predetermined thickness. A fastener is provided and has a threaded stem defining a first end thereof. The threaded stem is passed through the aperture of the rule member and operatively extends into the threaded aperture of the slide member. The fastener further has an annular shoulder positioned at inner end of the threaded stem and abuttingly engages the rule member being in frictional engagement with the base member. A pair of end members is provided with each of the pair of end members secured to a respective end of the first elongated body for closing a respective end of the elongated groove so that to retain the slide member therewithin. The tool additionally includes means for marking an arc. Such arc marking means includes an axial aperture formed through the fastener and through the threaded stem thereof. A pivot aperture is formed through the first elongated body of the base member on the longitudinal axis thereof and defines a pivoting axis of the second protractor means. A pin is slideably mounted within the axial aperture. The pin has a generally pointed first end and a mushroomed second end. The first end is adapted to pass through the pivot aperture and extend past an opposed surface of the first elongated body when a predetermined force is applied axially to the second end of the pin. An axial bore is formed within the second end of the fastener. A bias means is disposed within the axial bore for biasing the second end of the pin in a direction away from a surface of the second end of the fastener. There is means for retaining the bias means within the axial bore. There is also means for positioning a marking implement at a preselected distance from the pivoting axis of the second protractor means. The marking implement positioning means includes at least one of a predetermined plurality of spaced apart apertures formed through the second elongated body and a holder mounted for sliding motion thereon. The predetermined plurality of spaced apart apertures are disposed along the longitudinal axis of the second elongated body between a second end thereof and a second end of the elongated slot.

OBJECTS OF THE INVENTION

It is, therefore, one of the primary objects of the present invention to provide a multi-functional combination carpentry tool.

Another object of the present invention is to provide a multi-functional combination carpentry tool that employs a base member and a rule member slideably movable about the base member.

Yet another object of the present invention is to provide a multi-functional combination carpentry tool having a rule member that can be frictionally clamped to a base member.

A further object of the present invention is to provide a multi-functional combination carpentry tool that employs protractor means for finding angles and scribing bevels or angular lines.

Yet a further object of the present invention is to provide a multi-functional combination carpentry tool that has a squaring groove in the base member for fixing the rule member on the base member in a T-square arrangement.

An additional object of the present invention is to provide a multi-functional combination carpentry tool that has a reduced weight.

Another object of the present invention is to provide a multi-functional combination carpentry tool that can be used for scribing an arc.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Prior to proceeding to the more detailed description of the present invention, it should be noted that, for the sake of clarity and understanding, identical components which have identical functions have been identified with identical reference numerals throughout the several views illustrated in the drawing figures.

The best mode for carrying out the invention is presented in terms of its presently preferred embodiment, herein depicted within FIGS. 1 through 7. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The present invention provides a multi-functional combination carpentry tool that is useable as an angle finder, bevel, 4' protractor, 4' carpenter's square, scribing tool, and compass and that can be folded for storage and transport.

Reference is now made, to FIGS. 1-5, wherein there is shown a multi-functional carpentry tool, generally designated as 10. The tool 10 includes a base member, generally designated as 20, best shown in FIGS. 1-2. The base member 20 includes an elongated body 22 having a uniform thickness throughout and a pair of straight longitudinal side edges 24. Each of the pair of side edges 24 is disposed substantially parallel to a longitudinal axis 23 of the elongated body 22. There is also a pair of major planar surfaces 26, 28 each disposed perpendicular to the pair of longitudinal side edges 24.

A longitudinally elongated groove 30 is provided within the elongated body 22 and has a longitudinal axis thereof substantially aligned with the longitudinal axis 23 of the elongated body 22. The groove 30 is defined by a generally rectangular main portion 32 formed in one major surface of the elongated body 22, referenced with numeral 26 in FIGS. 1-2 and 4. The main portion 32 has a base surface 34 disposed parallel to and recessed a first predetermined distance from the surface 26 of the elongated body 22. The main portion 32 also has a pair of longitudinal sides 36 each running parallel to a respective side edge 24 and disposed substantially perpendicular to the surface 26. The groove 30 further has a pair of longitudinal channels 38, each of the pair of channels 38 abutting a respective side 36 of the main portion 32 and extending a predetermined distance into the elongated body 22 toward a respective side edge 24. A bottom surface 39 of each channel 38 is disposed coplanar with a base surface 34 of the main portion 32. Although, the channels 38 have been illustrated in FIG. 4 as having a generally rectangular cross-section, thus forming a generally T-shaped cross-section of the elongated groove 30 in a plane perpendicular to the surface 26 of the elongated body 22, other cross-sections of the channels 38 may be employed in the present invention.

Figure 2:
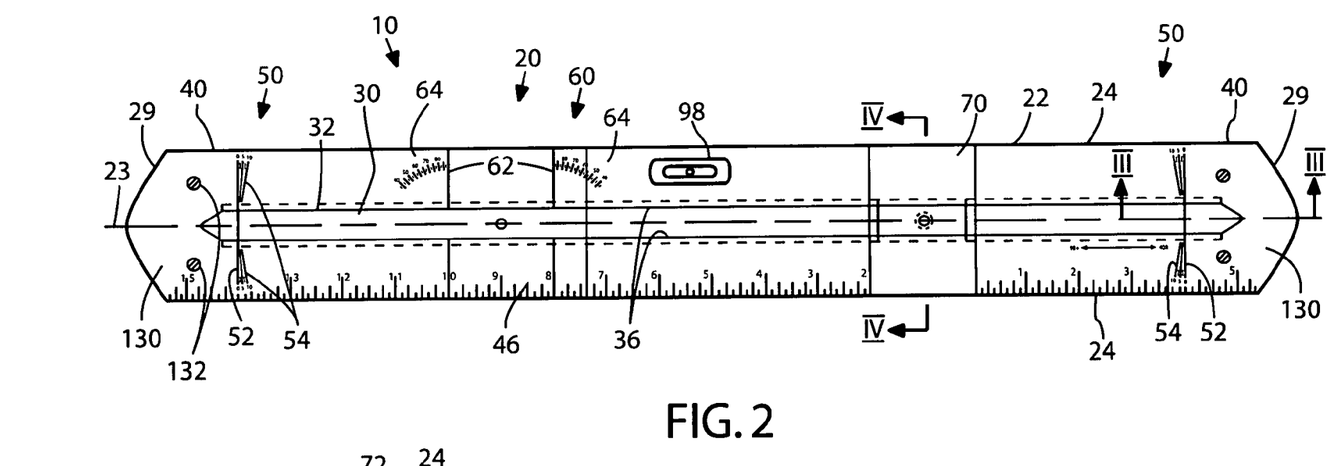
FIG. 2 illustrates a planar view of a base member used within the multi-functional combination carpentry tool of FIG. 1.
Figure 3:
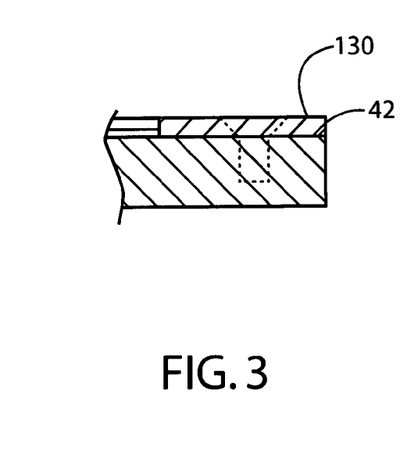
FIG. 3 is a partial cross-section view of the base member along lines III-III of FIG. 2.

The elongated body 22 further has a pair of end notches 40. Each of the pair of end notches 40 is disposed within the elongated body 22 so that a surface 42 of each end notch 40 is disposed substantially coplanar with the base surface 34 of the main portion 32 of the elongated groove 30.

The base member 20 also has a linear measuring scale indicia 46 disposed along one of the pair of side edge 24 of the elongated body 22. The linear measuring scale indicia 46 may be of any conventional type and its detail description is omitted in this document for the sake of brevity. It is also within the scope of the present invention to provide a second linear measuring scale indicia 46 disposed along an opposed side edge 24 as well as provide one or two linear measuring scale indicia 46 on the opposed surface 28.

The base member 20 further has a pair of first protractor means 50. Each of the pair of first protractor means 50 is disposed adjacent to and spaced from the respective end 29 of the elongated body 22. Each first protractor means 50 has a first mark line 52 provided on the surface 26 of the elongated body perpendicular to the pair of parallel side edges 24. Each end of the first mark line 52 preferably terminates at the respective side edge 24. The first mark line 52 is interrupted by the elongated groove 30. There is also a pair of first angular measuring scale indicia 54 disposed on the surface 26 of the elongated body 22. Each of the pair of first angular measuring scale indicia 54 is aligned relative to each of one side of the first mark line 52 and the respective side edge 24 of the elongated body 22. Each first angular measuring scale indicia 54 may be of any conventional type and its detail description is omitted in this document for the sake of brevity. The first protractor means 50 is generally used for finding/measuring angles during installation and scribing respective bevels at the end of a sheet stock 2.

The base member 20 may additionally include a second protractor means 60 disposed mediate ends 29 of the elongated body 22. The second protractor means 60 is defined by a pair of spaced apart second mark lines 62 provided on the surface 26 of the elongated body 22 perpendicular to the pair of parallel side edges 24 thereof. Each second mark line 62 is also interrupted by the elongated groove 30 and preferably has each end thereof terminating at the respective side edge 24. There is a pair of second angular measuring scale indicia 64. Each of the pair of second angular measuring scale indicia 64 is aligned relative to one side of a respective second mark line 62 and one side edge 24 of the elongated body 22. As best, shown in FIGS. 1-2, each second angular measuring scale indicia 64 is oriented in a direction toward the respective end 29 of the elongated body 22. Each second angular measuring scale indicia 64 may be of any conventional type and its detail description is omitted in this document for the sake of brevity. The second protractor means 60 is generally used for scribing inclined lines on the sheet stock 2.

Figure 4:
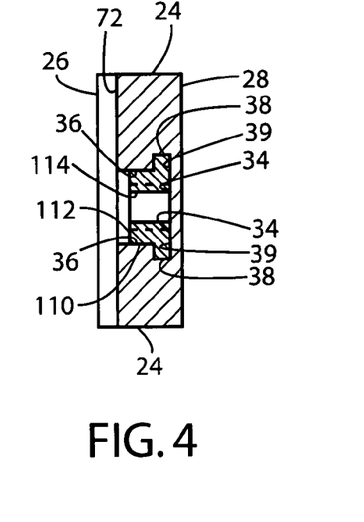
FIG. 4 is a partial cross-section view of the base member along lines IV-IV of FIG. 2.

The base member 20 finally includes a squaring groove 70 disposed mediate the ends 29 of the elongated body 22 and perpendicular to the longitudinal axis 23 thereof. Each end of the squaring groove 70 is aligned in open communication with the respective side edge 24 of the elongated body 22. A base surface 72 of the squaring groove 70 is recessed a second predetermined distance from the surface 26 of the elongated body 22, as best shown in FIG. 4.

Figure 1:
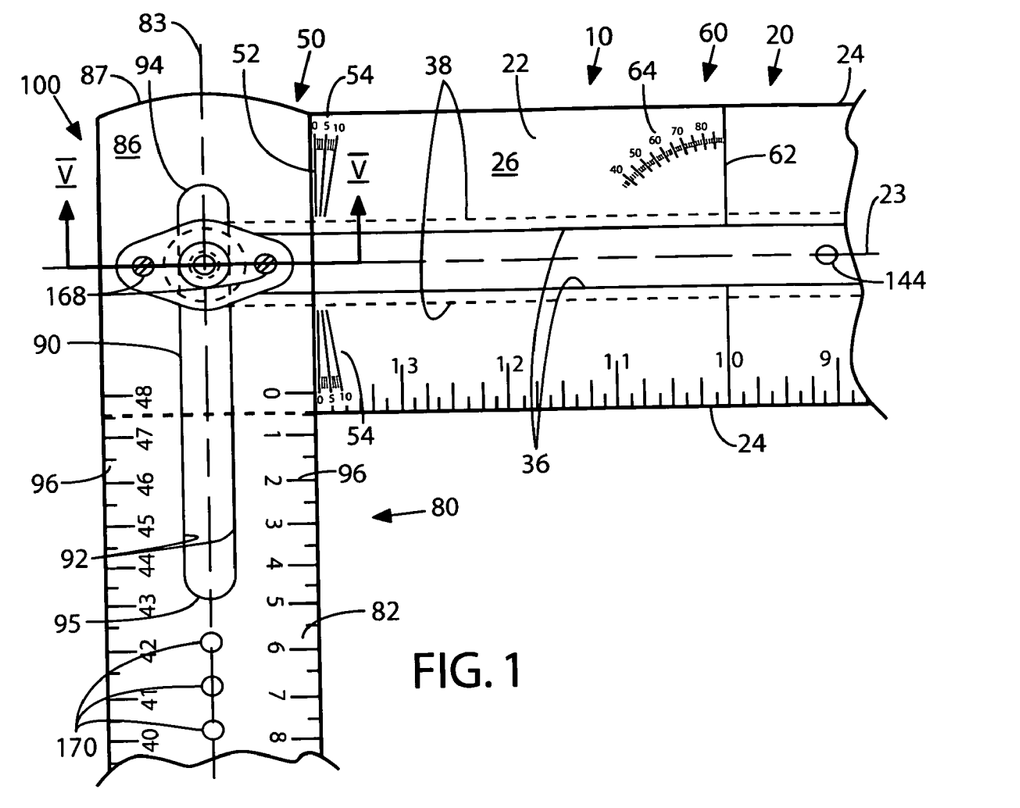
FIG. 1 illustrates a partial planar view of a multi-functional combination carpentry tool of the present invention.

The tool 10 further includes a rule member, generally designated as 80. The rule member 80 includes an elongated body 82 having a uniform thickness throughout and a pair of straight longitudinal side edges 84. Each of the pair of side edges 84 is disposed substantially parallel to a longitudinal axis 83 of the elongated body 82. There is also a pair of major planar surfaces 86, 88 disposed perpendicular to the pair of side edges 84.

An aperture 90 preferably having an elongated slot shape, is formed through the thickness of the elongated body 82 and is aligned with a longitudinal axis 83 thereof. Thus, each longitudinal edge 92 of the elongated slot 90 is disposed substantially parallel to a respective side edge 84. The elongated slot 90 has a first end 94 thereof disposed adjacent to and spaced from a first end 87 of the elongated body 82.

A pair of linear measuring scale indicia 96 is provided on one surface of the elongated body 82, referenced with numeral 86 in FIG. 1. Each of the pair of linear measuring scale indicia 96 is disposed along the respective side edge 84 thereof. Each linear measuring scale indicia 96 may be of any conventional type and its detail description is omitted in this document for the sake of brevity. It is also within the scope of the present invention to provide the linear measuring scale indicia 96 on the opposed major surface 88 of the elongated body 82.

The tool 10 also includes a conventional bubble level 98 mounted within a predetermined portion of the first elongated body 22 of the base member 20 in operative alignment with the one side edge 24 thereof. However, it is within the scope of the present invention to provide additional bubble levels 98 as well as mount the bubble level 98 within the rule member 80.

Figure 5:
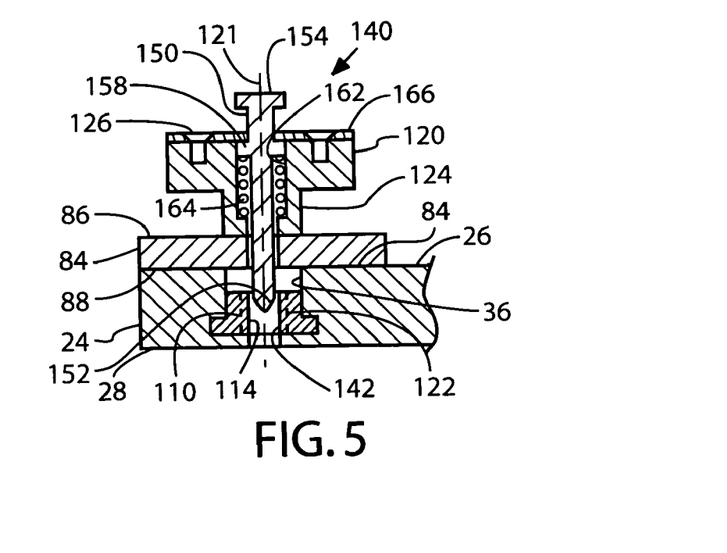
FIG. 5 is a cross-section view of the multi-functional combination carpentry tool along lines V-V of FIG. 1, particularly illustrating a pivot locking arrangement for scribing an arc.

Yet further, the tool 10 includes a clamping means, generally designated as 100 and best shown in FIGS. 1 and 4-5, for selectively securing the base member 20 and the rule member 80 together in frictional engagement maintaining the base member 20 and the rule member 80 in selected positions relative to one another and permitting each of a sliding and pivoting movement of the rule member 80 relative to the base member 20. In accordance with a presently preferred embodiment of the invention, the clamping means 100 includes a slide member 110 having each of a T-cross-section so that the slide member 100 is operatively and slideably received within the elongated groove 30 of the elongated body 22 of the base member 20, a predetermined thickness so that an upper surface 112 of the slide member 110 is recessed a third predetermined distance from the surface 26 of the elongated body 22, and a threaded aperture 114 formed, preferably centrally, through the predetermined thickness.

The clamping means 100 further includes a fastener 120 having a threaded stem 122 defining a first end thereof. In use to clamp rule member 80 to the base member 20, the threaded stem 122 is passed through the elongated slot 90 of the rule member 80 and operatively extends into the threaded aperture 114. The fastener 120 further has an annular shoulder 124 positioned at inner end of the threaded stem 122 and abuttingly engaging the surface 86 of the rule member 80 being in frictional engagement, by way of its other surface 88, with the base member 20. Conventionally, the fastener 120 is manually rotated in one direction to frictionally clamp the rule member 80 to the base member 20 and manually rotated in an opposed direction to remove such frictional clamping and enable movement of the rule member 80 relative to the base member 20.

The thickness or height of the slide member 110 is determined so as to position its upper surface 112 below the base surface 72 of the squaring groove 70. This will assure a proper frictional tension generated by the fastener 120 when the elongated body 82 is seated within the squaring groove 70. In other words, such third predetermine distance from the surface 26 of the elongated body 22 will provide for an operative clearance or gap between the surface 88 of the rule member 80 and the upper surface 112 of the slide member 110.

Additionally, the tool 10 includes a pair of end members 130, each of the pair of end members 130 secured, with fasteners 132, to a respective end notch 40 of the elongated body 20 for closing a respective end of the elongated groove 30 so as to retain the slide member 110 therewithin during use.

The tool 10 finally includes means, generally designated as 140, for marking or scribing an arc 4. Now in reference to FIGS. 5 and 7, and in accordance with a presently preferred embodiment of the invention, such arc marking means 140 includes an axial aperture 142 formed through the longitudinal axis 121 of the fastener 120 including the threaded stem 122. There is a pivot aperture 144 that is formed through the elongated body 22 of the base member 20 on the longitudinal axis 23 thereof and that defines a pivoting axis of the second protractor means 60. A pin 150 is slideably mounted within the axial aperture 142. The pin 150 has a generally pointed first end 152 and a mushroomed second end 154. The first end 152 is adapted to pass through the pivot aperture 144 and extend past the opposed surface 28 of the elongated body 22 when a predetermined force is applied axially to the second end 154 of the pin 150.

Although the pin 150 may be removed when not in use for marking or scribing the arc 4, the present invention provides for semi-permanently mounting of the pin 150 within the fastener 120 and accordingly provides a retaining and biasing means. Such retaining and biasing means includes an axial bore 162 formed within the second end 124 of the fastener 120. A bias means, such as a conventional spring 164, is disposed within the axial bore 162 and is caged by an annular shoulder 158 of the pin 150 for biasing the second end 154 of the pin 150 in a direction away from a surface 126 of a second end 124 of the fastener 120. A retaining member, for example such as plate 166, is provided for retaining the spring 164 within the axial bore 162 and is secured to the surface 126, for example, with fasteners 168.

There is also means for positioning a marking implement 6 at a preselected distance from the pivoting axis of the second protractor means 60. In accordance with the presently preferred embodiment of the invention, such marking implement positioning means includes at least one and, preferably, a predetermined plurality of spaced apart apertures 170 formed through the elongated body 82 of the rule member 80, wherein the predetermined plurality of spaced apart apertures 170 are disposed along the longitudinal axis 83 of the elongated body 82 between a second end thereof and a second end 95 of the elongated slot 90.

Alternatively, such marking implement positioning means may include a holder (not shown) mounted for sliding motion on said elongated body 82 of the rule member 80. The holder may be of the type disclosed in U.S. Pat. No. 5,915,806 issued to Levee, whose teachings are incorporated into this document by reference thereto.

Each of the base member 20 and the rule member 80 are preferably manufactured from a metallic material, and it is presently preferred to use aluminum material to reduce weight of the tool 10. It has been found that the base member 20 having a length of about twenty-two (22) inches is adequate for use in most applications. The presently preferred length of the rule member 80 is about fifty-one (51) inches so as to accommodate standard sheet stock of four (4) feet in width. Other sizes of the base member 20 and the rule member 80 are also within the scope of the present invention.

It will be appreciated from the above discussion that the multi-functional combination carpentry tool 10 that is useable as an angle finder, bevel, 4' protractor, 4' carpenter's square, scribing tool, and compass and also can be folded for storage and transport.

Figure 6:
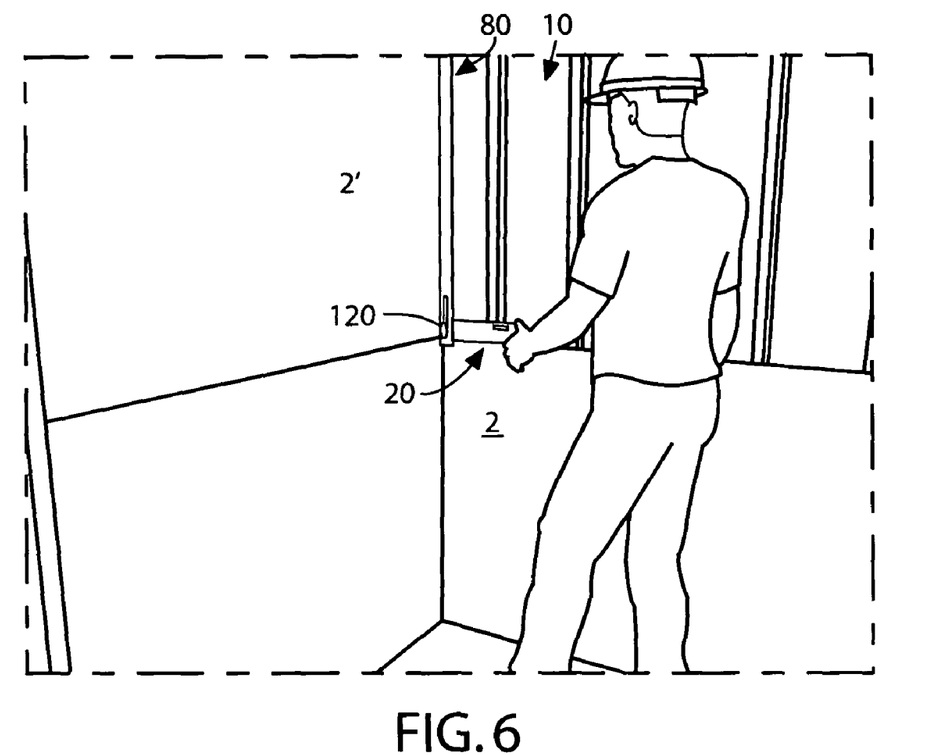
FIG. 6 is an environmental view of the multi-functional combination carpentry tool of FIG. 1 in use for beveling an end of the sheet stock.

Now in a particular reference to FIG. 6, therein is illustrated the tool 10 in use for finding/measuring angles. The base member 20 is positioned so that one of its longitudinal side edges 24 abuts the upper edge of the sheet stock 2. The rule member 80 is then positioned at one end 29, illustrated as a left end, and is pivoted upwardly. The rule member 80 is then positioned so that its longitudinal side edge 84 abuts the surface of the adjacent sheet stock 2'. The resulting angle is determined at the first protractor means 50 and, more particularly, by one of the pair of first angular measuring scale indicia 54 depending on the direction of the angle. To scribe, if necessary a corresponding bevel line on the new sheet stock (not shown) to be installed above the sheet stock 2, the rule member 80 may be rotated downwardly and clamped to the base member 20 at the measured angle. Downward rotation is enhanced by the elongated slot 90 of the rule member 80 enabling a linear movement thereof relative to the base member 20 in order to accommodate standard sheet stock width of about forty-eight (48) inches within a conventional ceiling height of between ninety (90) and ninety-six (96) inches. Advantageously, the rule member 80 is easily movably to the other end of the base member 20, by way of the slide member 110, for determining the angle at the opposed end without flipping the base member 20 over as the linear indicia markings 46 are generally disposed only on one major surface 26, 28.

Figure 7:
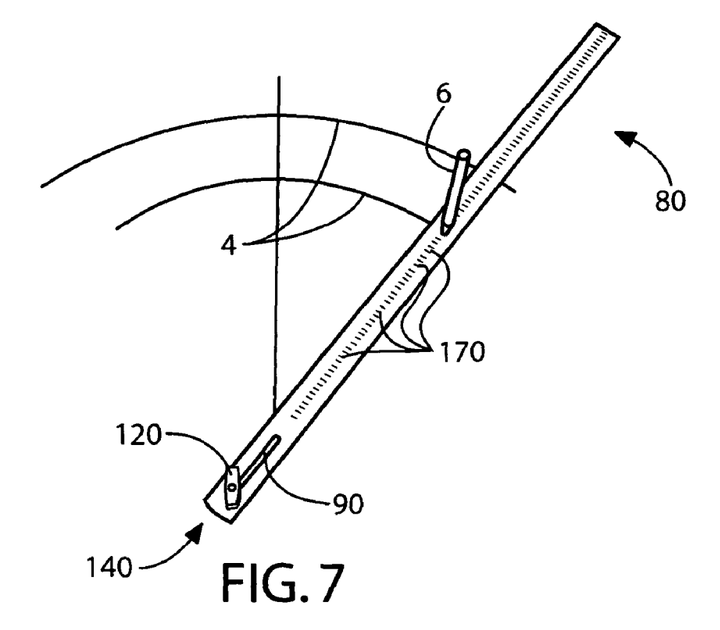
FIG. 7 illustrates an environmental view of the multi-functional combination carpentry tool of FIG. 1 in use for scribing an arc.

Now in a particular reference to FIG. 7, the rule member 80 is illustrated in use for scribing an arc or circle 4. The fastener 120 is inserted into the slot 90 and the pin 150 is pressed down so that its pointed end 152 partially penetrates the surface of the sheet stock 2 to define the pivot axis thereon. The marking implement, such as a conventional pencil 6 is then inserted with its operative end through a selected one of the plurality of apertures 170 and the rule member 80 is pivoted about the pin 150 resulting in the arc 4 being scribed. It also would be appreciated that the arc 4 can be scribed without removal or disengagement of the rule member 80 from the base member 20. When the arc or circle 4 is scribed, the pin 150 is disengaged from the sheet stock 2 by lifting the fastener 120 and the rule member 80 is removed or repositioned.

The pin 150 is also used in locking the pivot axis of the second protractor means 60 by first engaging the pointed end 152 of the pin 150 into the pivot aperture 144 formed within the base member 20 and then manually rotating the fastener 120 to provide for frictional clamping of the rule member 80 to the base member 20.

Finally, it will be understood that to facilitate storage and carrying of the tool 10, the rule member 80 may be rotated and clamped so that the longitudinal axis 83 of the elongated body 82 is parallel to the longitudinal axis 23 of the elongated body 22

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:
1. A multi-functional carpentry tool comprising:
  (a) a base member including:
    i. a first elongated body having a first uniform thickness throughout, a pair of first side edges, each of said pair of first side edges disposed substantially parallel to a longitudinal axis of said first elongated body, and a pair of major surfaces disposed perpendicular to said pair of first side edges, and
    ii. an elongated groove having a longitudinal axis thereof substantially aligned with said longitudinal axis of said first elongated body, said groove defined by a main portion formed in one surface of said first elongated body, said main portion having each of a base surface disposed parallel to and recessed a first predetermined distance from said one surface of said first elongated body and a pair of parallel sides, said groove further having a pair of channels, each of said pair of channels abutting a respective side of said main portion and extending a predetermined distance into said first elongated body toward a respective first side edge, whereby a bottom surface of said each channel is disposed coplanar with a base surface of said main portion and whereby said pair of channels form a generally T-shaped cross-section of said elongated groove in a plane perpendicular to said one surface of said first elongated body;
  (b) a pair of end protractor means, each of said pair of end protractor means disposed adjacent to and spaced from a respective end of said first elongated body, said each end protractor means having a base mark line provided on said one surface of said first elongated body perpendicular to said pair of parallel first side edges thereof, and a pair of angular measuring scale indicia, each of said pair of angular measuring scale indicia aligned relative to each of said base mark line and one first side edge of said first elongated body;
  (c) a rule member including:
    i. a second elongated body having a second uniform thickness throughout and a pair of second side edges, each of said pair of second side edges disposed substantially parallel to a longitudinal axis of said second elongated body, and
    ii. an aperture formed through said second elongated body adjacent to and spaced from one end of said second elongated body;
  (d) a slide member having each of a T-cross-section so that said slide member is operatively and slideably received within said elongated groove of said first elongated body, a predetermined thickness so that an upper surface of said slide member is recessed a third predetermined distance from said one surface of said first elongated body, and a threaded aperture centrally formed through said predetermined thickness;
  (e) a fastener having a threaded stem defining a first end thereof, said threaded stem passed through said aperture of said rule member and operatively extending into said threaded aperture, said fastener further having an annular shoulder positioned at inner end of said threaded stem and abuttingly engaging said one surface of said rule member being in frictional engagement with said base member;
  (f) an axial aperture formed through said fastener and through said threaded stem;
  (g) a pivot aperture formed through said first elongated body of said base member on said longitudinal axis thereof and defining a pivoting axis of said second protractor means;
  (h) a pin slideably mounted within said axial aperture, said pin having a generally pointed first end and a mushroomed second end, said first end adapted to pass through said pivot aperture and extend past an opposed surface of said first elongated body when a predetermined force is applied axially to said second end of said pin;

(i) an axial bore formed within said second end of said fastener;

(j) a bias means disposed within said axial bore for biasing said second end in a direction away from a surface of a second end of said fastener;

(k) means for retaining said bias means within said axial bore; and (l) means for positioning a marking implement at a preselected distance from said pivoting axis of said second protractor means, said marking implement positioning means including at least one of a predetermined plurality of spaced apart apertures formed through said second elongated body and a holder mounted for sliding motion thereon, wherein said predetermined plurality of spaced apart apertures disposed along said longitudinal axis of said second elongated body between a second end thereof and a second end of said elongated slot.

2. The tool, according to claim 1, wherein said tool includes a linear measuring scale indicia disposed on said one surface of said first elongated body along a predetermined side edge thereof.

3. The tool, according to claim 1, wherein said tool includes a pair of linear measuring scale indicia, each of said pair of linear measuring scale indicia disposed on one surface of said second elongated body along a respective second side edge thereof.

4. The tool, according to claim 1, wherein said tool includes additional protractor means disposed mediate ends of said first elongated body and defined by a pair of spaced apart second mark lines provided on said one surface of said first elongated body perpendicular to said pair of parallel first side edges thereof and a pair of second angular measuring scale indicia, each of said pair of second angular measuring scale indicia aligned relative to each of a respective second mark line and one first side edge of said first elongated body.

5. The tool, according to claim 1, wherein said tool includes a squaring groove disposed mediate said ends of said first elongated body and perpendicular to said longitudinal axis thereof, wherein each end of said squaring groove is aligned in open communication with said respective first side edge of said first elongated body and wherein a base surface of said squaring groove is recessed a second predetermined distance from said one surface of said first elongated body.

6. The tool, according to claim 1, wherein said tool includes at least one bubble level mounted within a predetermined portion of one of said first and second elongated bodies in operative alignment with a respective side edge thereof.

7. A multi-functional carpentry tool comprising:

(a) a base member including:
  i. a first elongated body having a first uniform thickness throughout, a pair of first side edges, each of said pair of first side edges disposed substantially parallel to a longitudinal axis of said first elongated body, and a pair of major surfaces disposed perpendicular to said pair of first side edges,
  ii. an elongated groove having a longitudinal axis thereof substantially aligned with said longitudinal axis of said first elongated body, said groove defined by a main portion formed in one surface of said first elongated body, said main portion having each of a base surface disposed parallel to and recessed a first predetermined distance from said one surface of said first elongated body and a pair of parallel sides, said groove further having a pair of channels, each of said pair of channels abutting a respective side of said main portion and extending a predetermined distance into said first elongated body toward a respective first side edge, whereby a bottom surface of said each channel is disposed coplanar with a base surface of said main portion and whereby said pair of channels form a generally T-shaped cross-section of said elongated groove in a plane perpendicular to said one surface of said first elongated body,
  iii. a pair of end notches, each of said pair of end notches disposed in said one surface of said first elongated body at a respective end thereof, wherein a surface of said each end notch is disposed substantially coplanar with said base surface of said main portion of said elongated groove,
  iv. a first linear measuring scale indicia disposed along one first side edge of said first elongated body,
  v. a pair of first protractor means, each of said pair of first protractor means disposed adjacent to and spaced from said respective end of said first elongated body, said each first protractor means having a first mark line provided on said one surface of said first elongated body perpendicular to said pair of parallel first side edges thereof, and a pair of first angular measuring scale indicia, each of said pair of first angular measuring scale indicia aligned relative to each of said first mark line and said respective first side edge of said first elongated body,
  vi. a second protractor means disposed mediate ends of said first elongated body, said second protractor means defined by a pair of spaced apart second mark lines provided on said one surface of said first elongated body perpendicular to said pair of parallel first side edges thereof and a pair of second angular measuring scale indicia, each of said pair of second angular measuring scale indicia aligned relative to each of a respective second mark line and one first side edge of said first elongated body, and
  vii. a squaring groove disposed mediate said ends of said first elongated body and perpendicular to said longitudinal axis thereof, wherein each end of said squaring groove is aligned in open communication with said respective first side edge of said first elongated body and wherein a base surface of said squaring groove is recessed a second predetermined distance from said one surface of said first elongated body;

(b) a rule member including:
  i. a second elongated body having a second uniform thickness throughout and a pair of second side edges, each of said pair of second side edges disposed substantially parallel to a longitudinal axis of said second elongated body,
  ii. an elongated slot formed through said second elongated body and aligned with a longitudinal axis thereof, said elongated slot having a first end thereof disposed adjacent to and spaced from a first end of said second elongated body, and
  iii. a pair of second linear measuring scale indicia, each of said pair of second linear measuring scale indicia disposed on one surface of said second elongated body along a respective second side edge thereof;

(c) at least one bubble level mounted within a predetermined portion of one of said first and second elongated bodies in operative alignment with a respective side edge thereof;

(d) a clamping means for selectively securing said base member and said rule member together in frictional engagement maintaining said base member and said rule member in selected positions relative to one another and permitting each of a sliding and pivoting movement of said rule member relative to said base member, said clamping means including:
   i. a slide member having each of a T-cross-section so that said slide member is operatively and slideably received within said elongated groove of said first elongated body, a predetermined thickness so that an upper surface of said slide member is recessed a third predetermined distance from said one surface of said first elongated body, and a threaded aperture centrally formed through said predetermined thickness, and
   ii. a fastener having a threaded stem defining a first end thereof, said threaded stem passed through said aperture of said rule member and operatively extending into said threaded aperture of said slide member, said fastener further having an annular shoulder positioned at inner end of said threaded stem and abuttingly engaging said one surface of said rule member being in frictional engagement with said base member;
(e) a pair of end members, each of said pair of end members secured to a respective end of said first elongated body for closing a respective end of said elongated groove so that to retain said slide member therewithin; and
(f) means for marking an arc, said arc marking means including:
   i. an axial aperture formed through said fastener and through said threaded stem,
   ii. a pivot aperture formed through said first elongated body of said base member on said longitudinal axis thereof and defining a pivoting axis of said second protractor means,
   iii. a pin slideably mounted within said axial aperture, said pin having a generally pointed first end and a mushroomed second end, said first end adapted to pass through said pivot aperture and extend past an opposed surface of said first elongated body when a predetermined force is applied axially to said second end of said pin,
   iv. an axial bore formed within said second end of said fastener,
   v. a bias means disposed within said axial bore for biasing said second end of said pin in a direction away from a surface of said second end of said fastener,
   vi. means for retaining said bias means within said axial bore, and
   vii. means for positioning a marking implement at a preselected distance from said pivoting axis of said second protractor means, said marking implement positioning means including at least one of a predetermined plurality of spaced apart apertures formed through said second elongated body and a holder mounted for sliding motion thereon, wherein said predetermined plurality of spaced apart apertures disposed along said longitudinal axis of said second elongated body between a second end thereof and a second end of said elongated slot.

8. A multi-functional carpentry tool comprising:
(a) a base member including:
   i. a first elongated body having a first uniform thickness throughout, a pair of first side edges, each of said pair of first side edges disposed substantially parallel to a longitudinal axis of said first elongated body, and a pair of major surfaces disposed perpendicular to said pair of first side edges, and
   ii. an elongated groove having a longitudinal axis thereof substantially aligned with said longitudinal axis of said first elongated body, said groove defined by a main portion formed in one surface of said first elongated body, said main portion having each of a base surface disposed parallel to and recessed a first predetermined distance from said one surface of said first elongated body and a pair of parallel sides, said groove further having a pair of channels, each of said pair of channels abutting a respective side of said main portion and extending a predetermined distance into said first elongated body toward a respective first side edge, whereby a bottom surface of said each channel is disposed coplanar with a base surface of said main portion and whereby said pair of channels form a generally T-shaped cross-section of said elongated groove in a plane perpendicular to said one surface of said first elongated body;
(b) a rule member including:
   i. a second elongated body having a second uniform thickness throughout and a pair of second side edges, each of said pair of second side edges disposed substantially parallel to a longitudinal axis of said second elongated body, and
   ii. an aperture formed through said second elongated body adjacent to and spaced from one end of said second elongated body;
(c) a clamping means for selectively securing said base member and said rule member together in frictional engagement maintaining said base member and said rule member in selected positions relative to one another and permitting each of a sliding and pivoting movement of said rule member relative to said base member, said clamping means including:
   i. a slide member having each of a T-cross-section so that said slide member is operatively and slideably received within said elongated groove of said first elongated body, a predetermined thickness so that an upper surface of said slide member is recessed a third predetermined distance from said one surface of said first elongated body, and a threaded aperture centrally formed through said predetermined thickness, and
   ii. a fastener having a threaded stem defining a first end thereof, said threaded stem passed through said aperture of said rule member and operatively extending into said threaded aperture, said fastener further having an annular shoulder positioned at inner end of said threaded stem and abuttingly engaging said one surface of said rule member being in frictional engagement with said base member; and
(d) means for marking an arc, said arc marking means including:
   i. an axial aperture formed through said fastener and through said threaded stem,
   ii. a pivot aperture formed through said first elongated body of said base member on said longitudinal axis thereof and defining a pivoting axis of said second protractor means,
   iii. a pin slideably mounted within said axial aperture, said pin having a generally pointed first end and a mushroomed second end, said first end adapted to pass through said pivot aperture and extend past an opposed surface of said first elongated body when a predetermined force is applied axially to said second end of said pin,
   iv. an axial bore formed within said second end of said fastener, v. a bias means disposed within said axial bore for biasing said second end of said pin in a direction away from a surface of said second end of said fastener, vi. means for retaining said bias means within said axial bore, and vii. means for positioning a marking implement at a preselected distance from said pivoting axis of said second protractor means, said marking implement positioning means including at least one of a predetermined plurality of spaced apart apertures formed through said second elongated body and a holder mounted for sliding motion thereon, wherein said predetermined plurality of spaced apart apertures disposed along said longitudinal axis of said second elongated body between a second end thereof and a second end of said elongated slot.

9. In combination with a carpentry tool having a base member and a rule member, a friction knob for selectively securing said base member and said rule member together in frictional engagement maintaining said base member and said rule member in selected positions relative to one another and permitting each of a sliding and pivoting movement of said rule member relative to said base member, said friction knob comprising:

(a) a body having a predetermined shape;

(b) a threaded stem formed on said body and defining a first end thereof, said threaded stem passed through one of a hole and a slot of said rule member and operatively extending into a threaded bore formed in said base member;

(c) an annular shoulder formed on said body and positioned at inner end of said threaded stem;

(d) an axial aperture formed through said body and through said threaded stem;

(e) a pivot aperture formed through said base member and defining a pivoting axis;

(f) a pin slideably mounted within said axial aperture, said pin having a generally pointed first end and an opposed second end, said first end adapted to pass through said pivot aperture and extend into said pivot aperture when a predetermined force is applied axially to said second end of said pin;

(g) an axial bore formed within a second end of said body;

(h) a bias means disposed within said axial bore for biasing said second end of said pin in a direction away from a surface of said second end of said body; and (i) means for retaining said bias means within said axial bore.

* * * * *